United States Patent [19]

Rosene

[11] 4,396,585

[45] Aug. 2, 1983

[54] SILVER REMOVAL WITH HALOGEN IMPREGNATED NON-CARBON ADSORBENTS

[75] Inventor: Michael R. Rosene, Pittsburgh, Pa.

[73] Assignee: Calgon Carbon Corporation, Pittsburgh, Pa.

[21] Appl. No.: 305,890

[22] Filed: Sep. 28, 1981

[51] Int. Cl.³ ............................................. C22B 11/00
[52] U.S. Cl. .................................. 423/25; 75/118 P; 75/118 R; 252/415; 252/441; 210/688; 210/753; 210/684
[58] Field of Search ................. 423/25, 27; 75/118 R, 75/118 P, 83; 252/415, 441, 444, 447; 210/688, 753, 501, 684

[56] References Cited

U.S. PATENT DOCUMENTS

| | | | |
|---|---|---|---|
| 2,939,803 | 6/1960 | Steele | 252/440 |
| 3,294,572 | 12/1966 | Piccoine et al. | 117/47 |
| 3,666,446 | 5/1972 | Cook et al. | 423/139 |
| 4,026,784 | 5/1977 | Rivers | 204/273 |
| 4,040,802 | 8/1977 | Deitz et al. | 55/71 |
| 4,051,026 | 9/1977 | Cremers et al. | 210/688 |
| 4,056,261 | 11/1977 | Darrah | 266/101 |
| 4,072,479 | 2/1978 | Sinha et al. | 55/73 |
| 4,075,282 | 2/1978 | Storp et al. | 423/230 |
| 4,111,766 | 9/1978 | Idota et al. | 204/109 |
| 4,131,454 | 12/1978 | Piret et al. | 75/83 |
| 4,166,781 | 9/1979 | Staples | 204/109 |

FOREIGN PATENT DOCUMENTS 43-8004065 10/1968 Japan .

*Primary Examiner*—O. R. Vertiz
*Assistant Examiner*—Robert L. Stoll
*Attorney, Agent, or Firm*—Martin L. Katz; R. Brent Olson; Ernest V. Linek

[57] ABSTRACT

The removal of silver from photographic and other solutions using a non-carbon halogen impregnated adsorbent is described.

6 Claims, No Drawings

SILVER REMOVAL WITH HALOGEN IMPREGNATED NON-CARBON ADSORBENTS

BACKGROUND OF THE INVENTION

This invention is directed to the removal of ionic silver from solutions using halogen impregnated adsorbents. Said solutions are usually aqueous; however, non-aqueous solutions containing silver metal complexes are also within the scope of the instant invention. As used herein, the term adsorbent(s) refers to those porous organic and inorganic materials capable of being impregnated with halogen including: the crystallogenetic adsorbents (natural and synthetic zeolites), activated alumina, activated silica, fuller's earth (and other adsorbent clays, e.q., bentonite, hectorite), ion exchange resins and the like.

This invention is especially directed to the removal of ionic silver from photographic processing solutions such as, developers, fixers, bleach fixers and washwaters by contacting said solutions with a quantity of halogen impregnated non-carbon containing adsorbent.

The term "ionic silver" as used herein, is defined as including both the cationic form of silver, $Ag^+$, the anionic silver thiosulfate complex, $[Ag(S_2O_3)_2]^{-3}$, and other silver metal complexes.

The silver complex present in most photographic processing solutions is known to exist as a stable, soluble silver-thiosulfate complex. The red-ox potential for the reduction of this complex to elemental silver is quite low, $E°=0.01$ V. Because of the low red-ox potential a strong reducing agent is necessary to carry out the reduction reaction.

Generally, the ionic silver present in photographic processing solutions is recovered by electrolytic methods. Generally, electrolytic recovery of ionic silver is useful only for ionic silver concentrations greater than 500 ppm. Typical electrolytic processes are described in U.S. Pat. Nos. 4,166,781; 4,111,766; and 4,026,784.

The disadvantages of the electrolytic method of silver removal from photographic solutions include; reducing the ionic silver concentration to below 500 ppm is difficult, capital expenditure for an electrolytic system is high, the system requires continuous monitoring and in addition to silver collecting at the cathode, the thiosulfate anion can be reduced to sulfide ion which immediately reacts with silver to form silver sulfide. This silver sulfide precipitate reduces the purity of the recovered silver.

Impregnated adsorbents have been used in numerous applications. Iodine has been recovered from a process stream via contact with alumina impregnated with oxides of copper and chromium (see U.S. Pat. No. 4,036,940 to McLane et al.). Inorganic adsorbents impregnated with acids and alkali metal salts have been employed in the purification of lactam compounds (see U.S. Pat. No. 3,960,846 to Potin et al.). Silica, impregnated with a transition metal oxide has been employed in devices involving electron bombardment (see U.S. Pat. No. 3,440,092 to Best et al.). Zeolites have been impregnated with alkali metals and used in the synthesis of acrylonitrile (see U.S. Pat. No. 3,527,784 to Smith).

Activated carbon has long been used as an adsorbent for removing metal ions from solutions. Carbon has been used in gold mining operations for the adsorption of $Au^+(CN)^-$, gold-cyanide since about 1880. The activated carbon is generally believed to act as a reducing agent, for example, adding an electron to the cationic metal ($M^+$) to form the elemental metal ($M°$). For example, the red-ox potential for the reduction of silver ($Ag^+$) is high, $E°=0.8$ V and a weak reducing agent is sufficient for carrying out the reaction. The elemental silver ($Ag°$) is then loosely bound to the activated carbon surface.

SUMMARY OF THE INVENTION

It has been discovered that halogen impregnated adsorbents are useful in the adsorption of ionic silver from aqueous photographic and other solutions. As used herein, the term "halogen" refers to iodine, bromine and chlorine (including any combination of iodine, bromine or chlorine). These impregnated adsorbents possess an adsorption affinity for the cationic ($Ag^+$) form, the anionic ($[Ag(S_2O_3)_2]^{-3}$) form and other ionic complexes of silver.

This invention is directed toward a process for the removal of ionic silver from a solution using halogen impregnated adsorbents. This invention is especially suited for removal of ionic silver from a solution wherein the electrolytic methods are not practicable.

Thus there is provided a process for removing ionic silver from a solution which comprises contacting said solution with a halogen impregnated adsorbent containing at least 0.1 weight percent halogen. The combination of the halogen impregnated adsorbent and the adsorbed, reduced ionic silver species may be further treated to recover the adsorbed silver.

DETAILED DESCRIPTION

The process of the present invention involves the removal of ionic silver from a solution by a halogen impregnated adsorbent. Selection of a suitable adsorbent starting material for use in this process will largely be within the ordinary skill of the artisan. As stated above, all adsorbents capable of being impregnated with halogen are deemed to be within the scope of the instant invention. Typically, adsorbents are impregnated with halogen by admixing a solution containing the halogen and the adsorbent to form a slurry and any unadsorbed halogen are plus the solvent removed by filtration. In the case of chlorine, the gaseous form may be passed through a column or other suitable container of adsorbent for effective impregnation.

The impregnated adsorbent may be employed in any conventional system as a trap for ionic silver. This includes an in-line filter system, a column arrangement, or as a reagent added to a solution to form a slurry.

The concentration of halogen impregnated on the adsorbent may vary from a fraction of 1 weight percent to as high as 100 weight percent, while the preferred concentration range is about 5 weight percent to about 50 weight percent. The most preferred concentration is about 10 weight percent.

The amount of impregnated adsorbent used to remove ionic silver from a solution will vary depending upon the amount of halogen present on the adsorbent, and the ionic silver concentration in the solution. Generally, when employing an adsorbent impregnated 10 percent with halogen, a minimum amount of adsorbent to solution of 1 gram per 100 ml is employed. The contact time required to achieve reduction of the ionic silver to silver compounds also varies depending upon the amount of adsorbent used, the concentration of halogen on the adsorbent and the ionic silver reduction and hence, concentration in the solution. Generally, ionic silver adsorption is rapid, especially at low initial ionic silver concentrations. However, for very high concentrations the reduction reaction, and therefore the adsorption process is notably slower. The reduction reactions of ionic silver complexes are reversible (albeit not completely) and this factor generally places a maximum time limit on the optimum contact time between the adsorbent and the solution after reduction. This too, varies with conditions, but there will usually be appreciable reversal of the reaction after several hours of exposure. It will be understood by those skilled in the art of adsorption that the described parameters may vary somewhat depending on the actual conditions under which the process of the present invention is employed.

Silver removal from solution may be monitored by any known analytical technique. After the impregnated adsorbent has been saturated with reduced silver species, no more ionic silver will be adsorbed—this is known as the breakthrough point. At, or before, this breakthrough point these reduced, adsorbed silver compounds may be recovered from the adsorbent and the adsorbent either regenerated or discarded. Since the silver thiosulfate complex reaction is reversible, sodium thiosulfate solution may be used to redissolve the silver compounds adsorbed on the carbon. The resulting solution, enriched in ionic silver, may then be passed through an electrolytic cell for the recovery of purified elemental silver.

The following examples will more completely illustrate the practice of this invention. It will be readily understood by those skilled in the art that these examples should not be construed as limiting the scope of this invention in any way.

While the following examples are directed to halogen impregnated activated carbon, non-carbon halogen impregnated adsorbents will behave in an analogous manner for adsorbing ionic silver.

Adsorption experiments are generally conducted in a 250 ml Erlenmeyer flask using a variable amount of halogen impregnated carbon and various dilutions of aqueous synthetic photographic silver-thiosulfate solution. Analysis for aqueous silver concentration is accomplished using atomic adsorption; wavelength 3281 Å, hollow cathode current 6 ma, slit size 3 Å and an oxidizing air acetylene flame. The carbon of the following examples is the PCB granular activated carbon manufactured by the Pittsburgh Activated Carbon Company, Pittsburgh, Pa. PCB carbon has a minimum iodine number of 1200; total surface area of 1150–1250 m$^2$/g (N$_2$, BET Method) and a minimum hardness number of 92.

EXAMPLE I (a) Activated carbon is impregnated with 10 weight percent iodine by adding 20 grams of 12×20 mesh PCB carbon to a solution of 2 grams I$_2$ in ethanol. The mixture is agitated, 50 ml water is added and the volume is reduced to about 50 ml by heating. The carbon is removed by filtration and dried for 2 hours at 120° C. The filtrate is found to be free of iodine.

(b) The 10% iodine impregnated PCB carbon, 1.038 grams, is admixed with 105 ml of synthetic aqueous photographic silver-thiosulfate solution. Initial aqueous silver concentration is 69 ppm silver. After 60 minutes agitation at room temperature the silver concentration is 3.4 ppm (95% removed). After 18 hours the silver concentration is 68 ppm. (2% removed).

EXAMPLE II

The iodine impregnated PCB carbon of Example I(a), 1.115 grams, is admixed with 100 ml of synthetic aqueous photographic silver-thiosulfate solution. Initial aqueous silver concentration is 3450 ppm silver. After 60 minutes agitation at room temperature the silver concentration is 2233 ppm (35% removed).

EXAMPLE III

The iodine impregnated PCB carbon of Example I(a), 1.113 grams, is admixed with 200 ml of synthetic aqueous photographic silver-thiosulfate solution. Initial aqueous silver concentration is 0.73 ppm. After 18 minutes agitation at room temperature the silver concentration is 0.24 ppm (67% removed).

The results of Examples I–III are summarized below in Table I.

TABLE I

SILVER REMOVAL** VS. TIME

| Time (min.) | Silver Concentration (ppm) | | |
|---|---|---|---|
| | Example I | II | III |
| 0 | 69 | 3450 | 0.73 |
| 5 | 38.5 | * | 0.33 |
| 10 | 27.9 | 3168 | * |
| 18 | * | * | 0.24 |
| 40 | 14.1 | * | * |
| 45 | * | * | * |
| 60 | 3.4 | 2233 | * |

*silver concentration not measured
**using iodine impregnated activated carbon as adsorbent

What is claimed is:

1. A process for removing ionic silver from a solution comprising contacting said solution with a halogen impregnated non-carbon adsorbent selected from natural zeolites, synthetic zeolites, activated alumina, activated silica Fuller's earth, bentonite clay, and hectorite clay, said adsorbent containing at least 0.1 weight percent halogen, said halogen being selected from the group consisting of iodine, bromine, chlorine or any combination of iodine, bromine and chlorine.

2. The process of claim 1 wherein the adsorbent contains from about 5 to 50 weight percent of iodine, bromine or chlorine, or any combination of iodine bromine, or chlorine.

3. The process of claim 2 wherein the adsorbent contains about 10 weight percent of iodine, bromine or chlorine or any combination of iodine bromine, or chlorine.

4. The process of claim 3 which further comprises contacting said solution and said adsorbent up to breakthrough, and wherein said ionic silver is the aqueous photographic silver-thiosulfate complex.

5. The process of claim 4 wherein the aqueous silver-thiosulfate complex concentration is less than 500 ppm.

6. The process of claims 1 or 2 or 3 or 4 wherein the halogen is iodine.

* * * * *